United States Patent
Boenick et al.

(10) Patent No.: US 6,444,996 B1
(45) Date of Patent: Sep. 3, 2002

(54) APPARATUS AND METHOD FOR THE DETECTION OF AN EDGE OF AN OBJECT

(75) Inventors: Rainer Boenick; Dietmar Heinemann; Joerg Geipel, all of Berlin (DE)

(73) Assignee: Nexpress Solutions LLC, Rochester, NY (US)

( * ) Notice: Subject to any disclaimer, the term of this patent is extended or adjusted under 35 U.S.C. 154(b) by 0 days.

(21) Appl. No.: 09/543,993

(22) Filed: Apr. 6, 2000

(51) Int. Cl.⁷ .............................................. G01N 21/86
(52) U.S. Cl. ........................ 250/559.36; 250/559.26; 250/223 R; 356/625
(58) Field of Search ................. 250/559.36, 559.15, 250/559.24, 559.26, 559.28, 559.4, 559.42, 559.43, 559.44, 559.46, 223 R, 223 B; 356/625, 634, 635, 636, 637; 271/227

(56) References Cited

U.S. PATENT DOCUMENTS 4,875,776 A * 10/1989 Pryor .......................... 356/625
5,007,739 A * 4/1991 Shimano et al. ....... 250/559.26

* cited by examiner

Primary Examiner—Kevin Pyo

(57) ABSTRACT

A method and apparatus for the detection of an edge of an object, with at least two photoelectric barriers, having at least one sender and at least one receiver apparatus as well as at least one common evaluation electronic unit for the detection of the edge or the presence of the object found on a transparent transporting belt. A diaphragm apparatus creates specially shaped light beam cross sections, wherein at least one light beam (B) is irradiated as a sufficiently narrow slit (5) in the direction of the edge to be detected, wherein the signals of the photoelectric barriers (3,4,10,11,12,13,14) are logically interconnected in the common evaluation unit (8).

9 Claims, 3 Drawing Sheets

APPARATUS AND METHOD FOR THE DETECTION OF AN EDGE OF AN OBJECT

FIELD OF THE INVENTION

This invention relates in general to an apparatus for the non-contact optical detection of an edge of an object, for example, the front and/or back edge of a paper sheet on a transparent transporting belt of a printing machine.

BACKGROUND OF THE INVENTION

The detection of the entry of the edge of an object into an area to be monitored is a common task for photoelectric barriers. The switching precision (in which the object recognized as present or not present) depends essentially on the shape and size of the light beam used for the detection, and on the switching thresholds in the evaluation of the receiver signal of the photoelectric barrier.

The object of the invention is to detect the entry of an edge of an object (2), located on a sufficiently transparent transporting belt (1), for example, a paper sheet, into a theoretical position with a high degree of precision. It is thereby essential that the edge to be detected is reliably distinguished from other features of the transporting device, such as markings and scratches on the transporting belt (1) or connecting seams of the belt—that is, the sensor apparatus should not recognize these features as the edge of the object to be detected (2). On the other hand, the detection of these additional features provides essential information for the operation of the transporting device; for this reason, their appearance should also be reliably identified and signaled via separate switching outlets of the photoelectric barrier apparatus (3,4). An essential boundary condition is to be found in the fact that both the adhesive seams and other connecting seams of the transporting belt (1), as well as the markings, primarily appear transverse to the direction in which the belt is moving.

To attain this goal, a method and apparatus with the features described by the embodiments and developments of the invention is described below.

SUMMARY OF THE INVENTION

In accordance with the invention, the reliable identification of the edge of the object is made possible by an apparatus consisting of several—in the embodiment presented, for example, three—separate, single-way photoelectric barriers, below referred to as measurement sites that, on the one hand, have a specific spatial apparatus and specially shaped light beam cross sections whose signals, on the other hand, are linked logically in an evaluation unit in such a way that the detection of the different features is made possible. This evaluation unit has separate outlets for the features to be detected—the edge of the object, connecting or adhesive seam, markings, and scratches.

The high precision of the switching point required for the detection of the edge of the sheet is attained by a suitably shaped light beam cross section of one of the measurement sites (5). This light beam has as short as possible an extension—for example, only a few micrometers—in the direction of movement of the belt (F). Thus, a high dynamics of the signal is brought about over a short travel distance of the transporting belt (1), so a very high switching precision is possible. Transverse to the direction of movement of the belt (F), the light beam of this measurement site (5) has a substantially greater extension, for example, several millimeters. Thus, optical integration takes place over irregularities of the edge of the object to be detected (2), which also ensures the switching precision with, for example, fibers protruding from the edge of the object. The measurement site (5) detects not only the edge of the object (2) with a high degree of precision, but also detects scratches, markings, and adhesive seams of the transporting belt (1), transverse to the direction of movement of the belt (F), which would thus trigger a faulty switching of the outlet for the detection of the object. Therefore, these features are to be identified by means of at least one other measurement site (6,7) with suitable light beam geometry and are to be separated by an evaluation unit (8), from the actual process that is to be detected—the entry of the edge of the object into the detection range. This purpose is met by at least one other measurement site (7), whose used light beam cross section has such a large area that it is not scratches, markings, adhesive, and connecting seams in this light beam that lead to a switching process at this measurement site (7), but rather the actual object (2). This measurement site (7) is advantageously located in the direction of movement of the belt before the measurement site (5) so that it is completely covered by the object (2), when its edge reaches the measurement site (5). Thus, the edge of the object (2) can be distinguished with sufficient clarity from the other features of the transporting belt (1) and its position can be precisely detected.

A prominent advantage of the apparatus in accordance with the invention is to be found in the very high precision of the switching point for the detection of the edge of the sheet with the guarantee that the edge of the sheet can be reliably distinguished from other features of the transporting belt (1) and thus false alarms due to these other features of the transporting belt (1) can be ruled out.

BRIEF DESCRIPTION OF THE DRAWINGS

The invention, and its objects and advantages, will become more apparent in the detailed description of the preferred embodiments presented below.

In the detailed description of the preferred embodiment of the invention presented below, reference is made to the accompanying drawings, in which.

DETAILED DESCRIPTION OF THE PREFERRED EMBODIMENTS

Referring now to the accompanying drawings.

Figure 1:
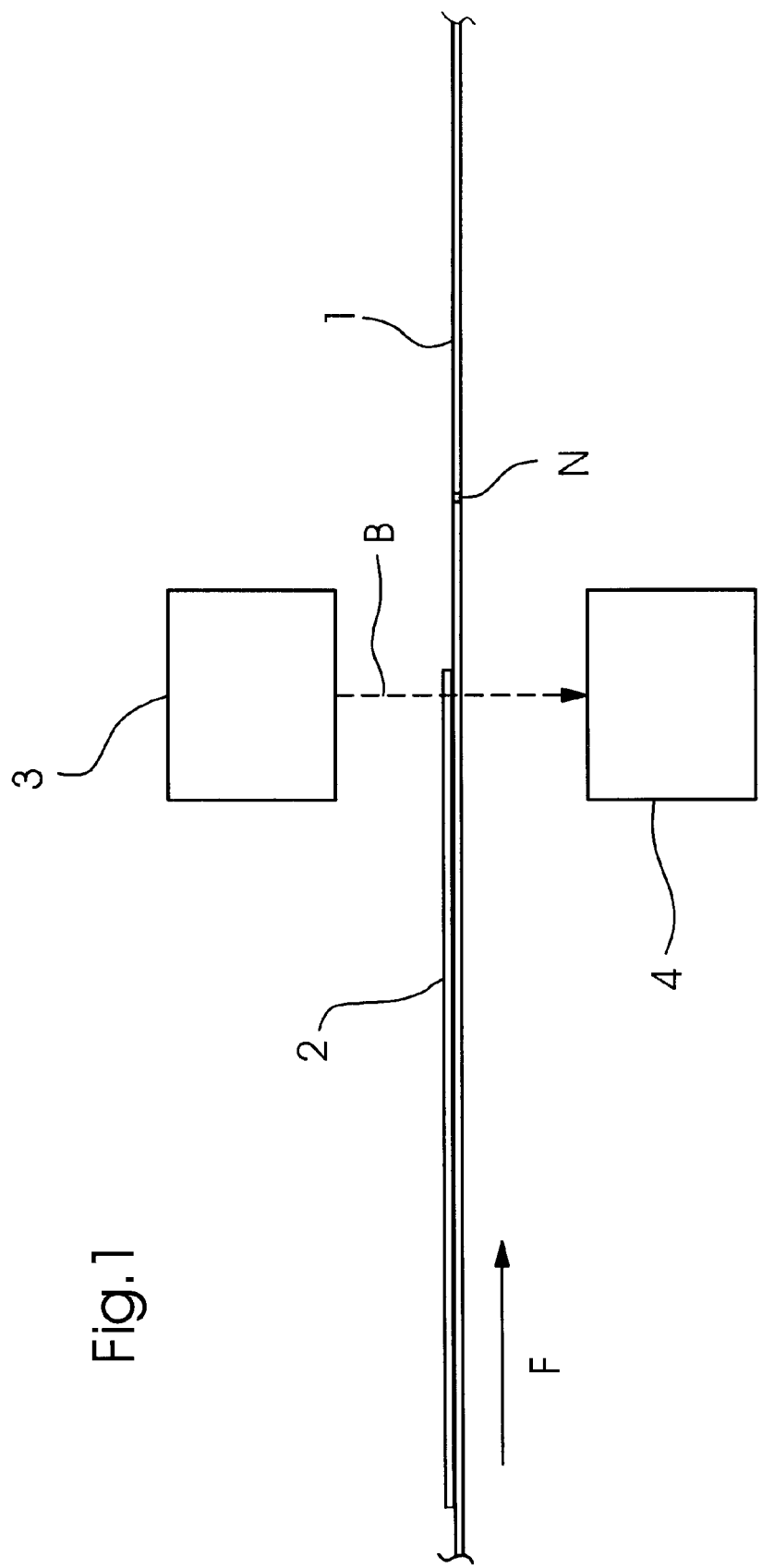
FIG. 1 is a side elevation view of the principle of an embodiment of the invention under consideration as a single-way photoelectric barrier.

FIG. 1 depicts a transparent transporting belt (1) with an adhesive seam (N), with which the object located on it (2), for example, a paper sheet, is moved in the direction of movement of the belt (F). Light beams (B) of a photoelectric barrier apparatus (3,4), consisting of senders and receivers, act vertical to the plane of the belt.

Figure 2:
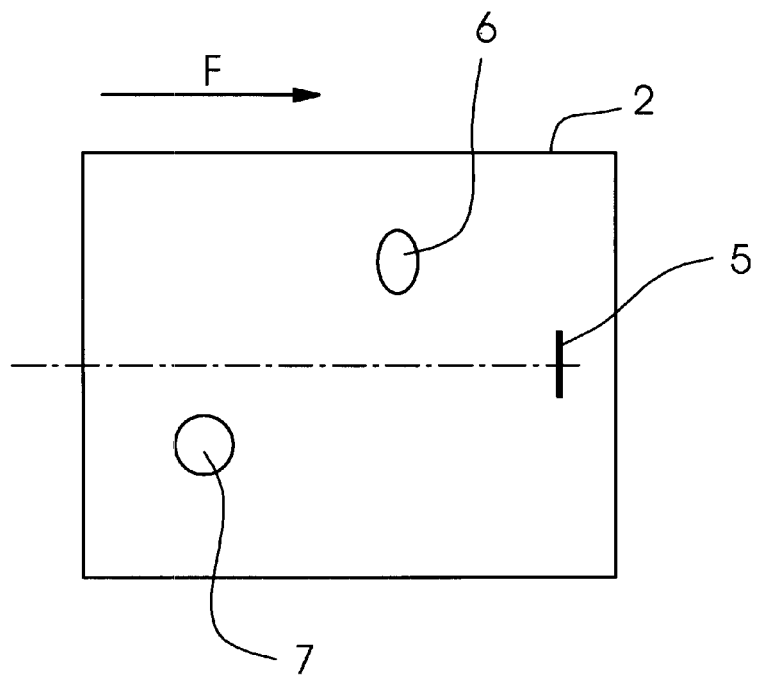
FIG. 2 is a plan view of a possible apparatus and form of the measurement sites.

One possible spatial apparatus, relative to the direction of movement of the belt (F), as well as possible light beam cross sections of individual measurement sites (5,6,7) are sketched in FIG. 2. The signals of the individual measurement sites (5,6,7) are sent to an evaluation unit (8), as shown in FIG. 3, which regulates the switching outlets, correlated to the individual features, of which, by way of example, one (9) is depicted, as a function of the signals of the individual measurement sites (5,6,7).

Figure 3:
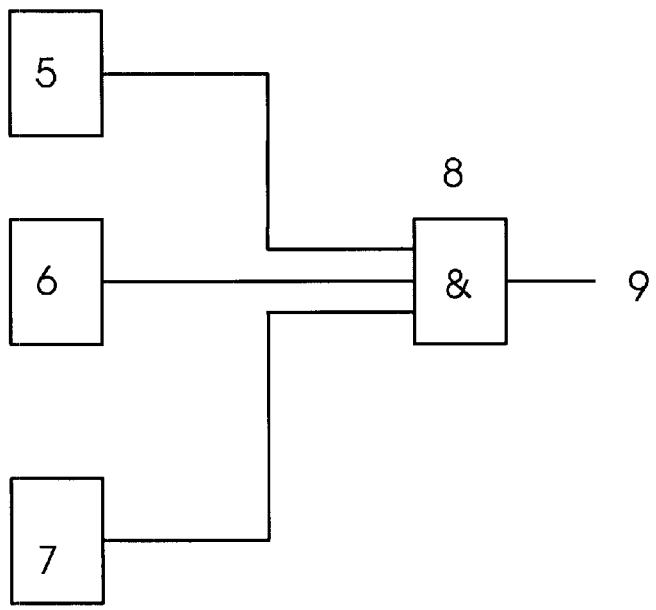
FIG. 3 is a block diagram of a possible evaluation scheme for the detection of an edge of an object.

The logic AND-operation of the signals of the measurement sites (5,6,7) in the evaluation unit (8), indicated in FIG. 3, corresponds to the detection of the edge of the object, which is thus indicated on the outlet (9). Alternatively, a computer may be part of the evaluation unit or other logic circuit may form the evaluation unit.

The other measurement site (6) indicated in FIG. 2 is used for the detection of the adhesive seam (N) of the transporting belt (1). This measurement site (6) is arranged in the direction of movement of the belt at approximately the same height as measurement site (5), for the detection of the edge; its used light beam cross section is, on the one hand, so large that scratches on the transporting belt (1) do not lead to a switching interconnection and, on the other hand, is so small that the optical transmission reduction brought about by the adhesive seam (N) triggers a switching interconnection. An adhesive seam is then identified in the evaluation unit (8), if the receivers (4) of the measurement sites (5) and (6) are blacked out, but the receiver (4) of measurement site (7) is not.

In a similar way, other features, determined with sufficient clarity in their position on the transporting belt (1) and in their extension in the direction of movement of the belt (F), are detected by additional suitably shaped and situated measurement sites and a suitable logic interconnection of the signals of the measurement sites.

Figure 4:
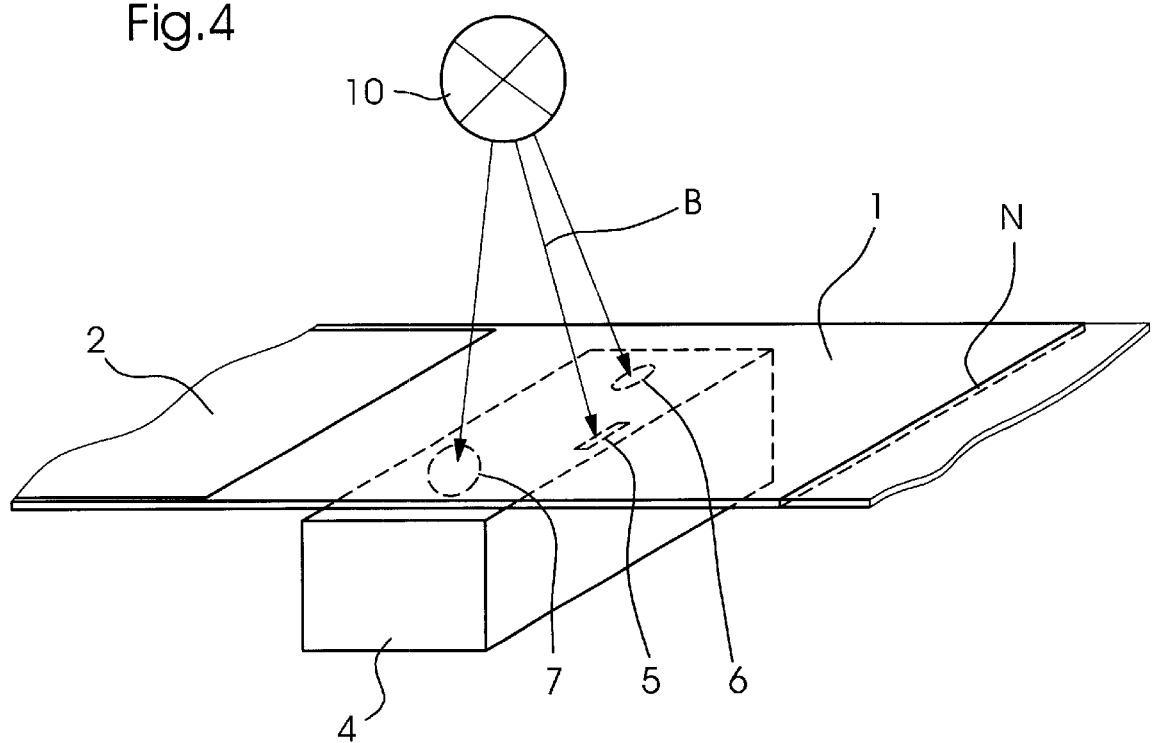
FIG. 4 is a view, in perspective, of an exemplary apparatus of several receivers, which receive transmission from by a sender.

The various receiver elements (4), required for the detection of the different features, can be beamed by separate sender elements or, as depicted in FIG. 4 by way of example, several measurement sites (5,6,7) can be beamed by one common sender element (10).

Figure 5:
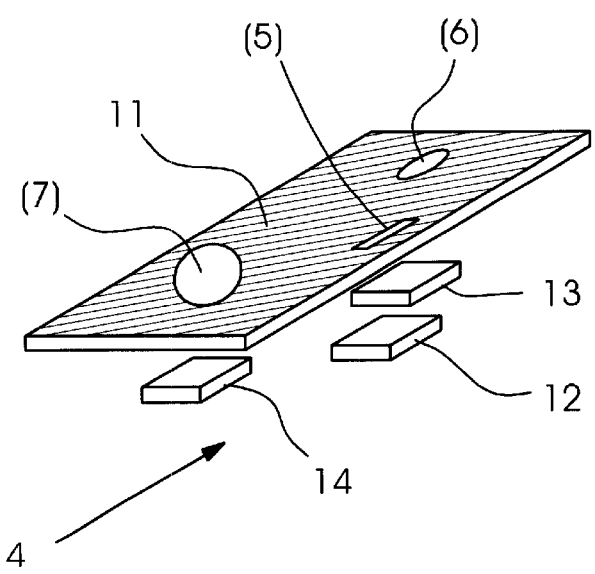
FIG. 5 is a view, in perspective, of an exemplified embodiment with a suitable diaphragm apparatus.

The implementation of a diaphragm apparatus that creates differently shaped light beam cross sections at the measurement sites 5, 6, 7 as depicted in FIG. 5, offers—for example, in comparison to differently shaped receivers—a greater flexibility in the selection of the receiver elements (12,13, 14) to be used and an easier adaptation to the detection of other features by changing or replacing the diaphragm (11), in the shape and apparatus of the measurement sites, while retaining the receiver elements (12,13,14).

Furthermore, a photolithographic production of the diaphragm structure (11) is advantageous for a higher switching accuracy due to a higher precision and reproducibility of the position and shape of the diaphragm openings for the individual measurement sites.

The invention has been described in detail with particular reference to certain preferred embodiments thereof, but it will be understood that variations and modifications can be effected within the spirit and scope of the invention.

PARTS LIST

Transporting belt
Object
Photoelectric barrier apparatus
Photoelectric barrier apparatus
Measurement site
Measurement site
Measurement site
Evaluation unit
Switch outlet
Sender element
Diaphragm
Receiver element
Receiver element
Receiver element
Direction of the movement of the belt
Adhesive seam

What is claimed is:

1. Apparatus for detecting an edge of an object, comprising:
at least two photoelectric barriers, each of the photoelectric barriers including at least one sender and at least one receiver apparatus with at least one evaluation electronic unit connected to the receiver apparatus, wherein the at least one common evaluation unit is operative for detection of the edge or presence of the object found on a transparent transporting belt and for detecting features of the transparent transporting belt, and wherein the photoelectric barriers (3,4,10,11,12,13, 14) have shaped light beam cross sections, formed from one light beam (B) being irradiated through a diaphragm (11) having a plurality of apertures including a sufficiently narrow slit (5) in the direction of the edge to be detected, and that signals of the photoelectric barriers (3,4,10,11,12,13,14) are determined in a common evaluation unit (8).

2. Apparatus according to claim 1, wherein at least two receivers (5,6,7) receive transmission from one common light source (10) as a sender (3).

3. Apparatus according to claim 1, wherein the diaphragm (11) is a vapor-deposited and photolithographically structured glass disk.

4. Apparatus according to claim 1, wherein, for the detection of a front and/or back edge of the object (2), the light beam irradiated as a sufficiently narrow slit (5) runs transverse to the direction of the movement of the belt (F).

5. Apparatus according to claim 1, wherein for the detection of a side edge of the object (2), the light beam irradiated as a sufficiently narrow slit (5) runs in the direction of movement of the belt (F).

6. A printing machine, comprising, an electrophotographic printing machine, with a transparent conveyance belt (1) for the transporting of sheets (2), wherein the printing machine includes an apparatus in accordance with claim 1 along the transporting path of the sheets (2).

7. Apparatus according to claim 1 wherein the photoelectric barriers are logically interconnected.

8. A method for detecting the edge of a product, comprising the steps of:
guiding the product lying on a transparent transport belt past at least two stationary light barriers, said light barriers containing at least one sender and one receiving set, the at least two stationary light barriers further comprising a diaphragm having different shaped apertures forming at least two different shaped beams of light for the at least two different light barriers;
generating a signal by means of electronic evaluation when a product edge passes through the light barrier and transmitting said signal to an evaluation unit for detecting said edge and determining the presence of said product;
whereby in a first light barrier the cross-section of a light bundle formed from a small gap is used, the gap extending in parallel with the edge to be detected;
whereby in a further light barrier the cross-section of a light bundle is used, the width of which perpendicular to the direction of said edge to be detected being considerably larger than the width of the gap formed by the light bundle of the first light barrier; and
whereby the signals of the receiving sets of the first and the further light barrier will be determined in an evaluation unit.

9. Method according to claim 8 wherein signals of the receiving sets of the first and the further light barrier are logically interconnected.

* * * * *